(12) United States Patent
Jaeger

(10) Patent No.: US 7,289,109 B2
(45) Date of Patent: Oct. 30, 2007

(54) METHOD AND APPARATUS FOR DETECTING ACTUATION OF A CONTROLLER DEVICE ON A TOUCH SCREEN

(76) Inventor: Denny Jaeger, 6120 Valley View Rd., Oakland, CA (US) 94611

( * ) Notice: Subject to any disclaimer, the term of this patent is extended or adjusted under 35 U.S.C. 154(b) by 89 days.

(21) Appl. No.: 09/928,726

(22) Filed: Aug. 13, 2001

(65) Prior Publication Data

US 2002/0036622 A1    Mar. 28, 2002

Related U.S. Application Data

(63) Continuation-in-part of application No. 09/670,610, filed on Sep. 26, 2000.

(51) Int. Cl.
G09G 5/00 (2006.01)
(52) U.S. Cl. ........................ 345/173; 345/161
(58) Field of Classification Search ........ 345/156–184; 178/18.01, 18.05, 18.07, 19.01, 19.03; G09G 5/00
See application file for complete search history.

(56) References Cited

U.S. PATENT DOCUMENTS

RE34,187 E  *  3/1993  Yamanami et al.  ...... 178/18.07
5,774,115 A  *  6/1998  Jaeger et al.  ................ 345/172
5,969,712 A  * 10/1999  Morita et al.  ................ 345/179
6,201,534 B1 *  3/2001  Steele et al.  ................. 345/157
6,515,654 B1 *  2/2003  Liao  ............................ 345/173
2001/0005198 A1 *  6/2001  Sakamoto et al.  .......... 345/163

FOREIGN PATENT DOCUMENTS

JP    11-095903    *  4/1999

* cited by examiner

Primary Examiner—Alexander Eisen
(74) Attorney, Agent, or Firm—Harris Zimmerman

(57) ABSTRACT

A system for interactively operating with a resistive touch screen for signaling that any physical control device applied to the touch screen has been touched. A field antenna extends about the perimeter of the touch screen to emit an EM field. Each physical control device includes a resonant antenna tuned to the EM field, and a simple switch on each physical control device completes the resonant antenna circuit only when the physical control device is touched by the user. The touch event may determine that a physical control device is being operated, and that all physical control devices should be turned ON, to the exclusion of other touch inputs to the touch screen. The LC resonant antenna may be incorporated in a pen wielded by a touch screen user, and the touch input may be used as a mouse click input.

24 Claims, 9 Drawing Sheets

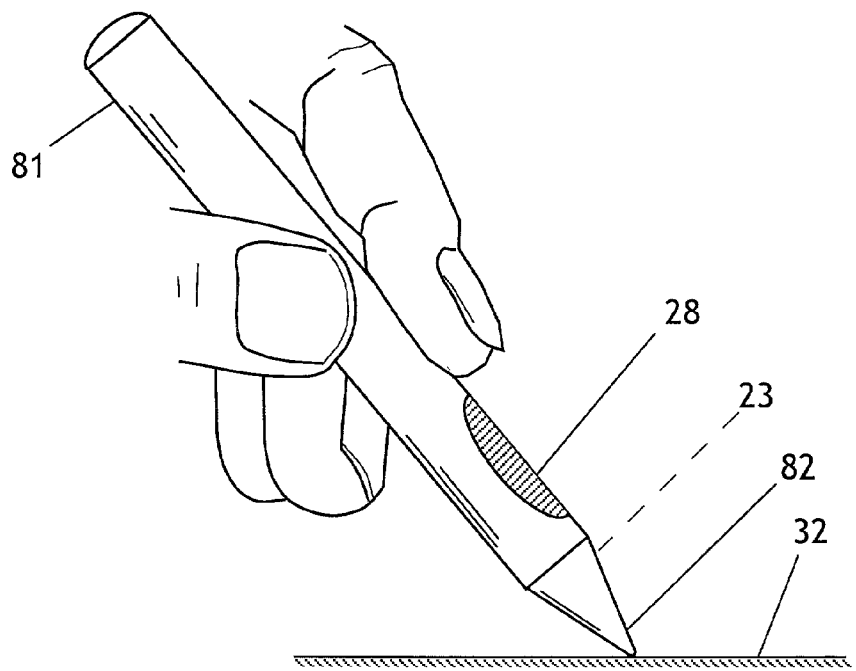
FIG. 8
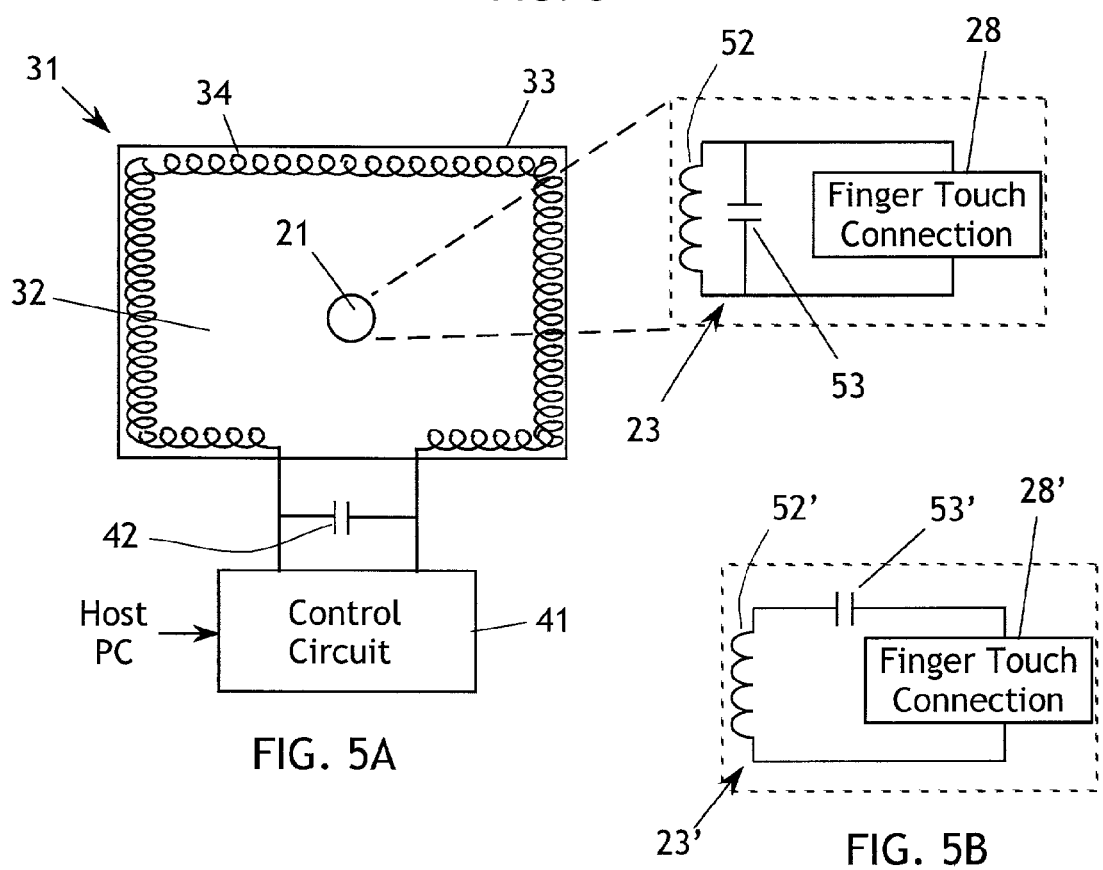
FIG. 5A
FIG. 5B

METHOD AND APPARATUS FOR DETECTING ACTUATION OF A CONTROLLER DEVICE ON A TOUCH SCREEN

REFERENCE TO RELATED APPLICATION

This application is a continuation-in-part of U.S. patent application Ser. No. 09/670,610, filed Sep. 26, 2000, for which priority is claimed.

BACKGROUND OF THE INVENTION

The patent application referenced above is incorporated herein by reference, particularly FIGS. 11, 12A-12F, 16, 17, 26, and 31-34 and the descriptions related thereto on pages 21-24, 26, 32-33, and 37-41 in the specification. This application describes, inter alia, the use of physical control devices that may be applied to a resistive-type touch screen to emulate mechanical control devices such as knobs, faders, joysticks, and mouse devices, provoking touch detections that are interpreted by software as control movements of the control devices. These touch detections are generally located within a screen area adjacent to the control device base, which is adhered to the outer surface of the touch screen.

It has been observed that the locus of the touch detections provoked by a physical control device is not confined within the outline of the base of the control device. When a control device such as a post is operated on the surface of a resistive touch screen, it presses on singular points of the touch screen, those points extending along the perimeter of the base of the post The locus of these touch points is generally a closed curved shape that is roughly centered with respect to the base of the post. It has been observed, however, that a certain amount of these touch detections are located outside the perimeter of the base, and may be spaced therefrom at a not insignificant distance. Thus a control device such as a post may generate touch detections at some distance from its location on the screen.

This distant touch phenomenon may be problematic when the control device is combined with on-screen active devices such as switches or other touch sensitive control areas that are actuated by a finger touch, stylus touch, or the like. For example, as shown in FIG. 1, a knob controller 11 comprised of a post may be joined to a resistive touch screen 12 to provoke touch inputs to the screen 12, and these touch inputs may be recognized as knob rotation, joystick directional movements, or mouse movements. In any case, fingertip operation of the controller 11 involves pressure applied through the perimeter of the base of the post that tends to generate closed curved loci 13 of touch detection points. Note that some of these closed curved loci 13 are spaced outwardly from the controller 11.

Generally the controller 11 is employed in combination with one or more virtual displayed devices portrayed on the display that is associated with the touch screen 12. Each virtual displayed device corresponds to a respective area on the touch screen, and any touch within that area is interpreted as a command to actuate the virtual displayed device. For example, a switch 14 may be placed proximate to the controller 11, and the switch may or may not have a function that interacts with the controller 11. However, it is clear from the fact that one or more locus of possible touch points of the controller 11 extends to intersect the touch sensitive area of the switch 14. Thus it is possible for a touch detection of knob controller 11 to generate a false touch command at the switch 14.

This potential problem could be solved by software that turns on and off the touch detection associated with physical control devices such as controller 11 and selectively ignore touch detections within some default distance of the physical controller. This solution would require a user to switch constantly between two modes: physical control devices enabled and virtual displayed devices disabled, and vice versa. This requirement is not consonant with an underlying concept of the invention, which seeks to provide seamless interaction between the devices displayed virtual displayed devices and the physical devices adhered to the touch screen.

SUMMARY OF THE INVENTION

The present invention generally comprises a system for eliminating any ambiguity in the touch detection of virtual displayed devices and physical devices operatively associated with a touch screen. The system of the invention operates interactively with a resistive touch screen, and is directed toward detecting that any physical control device applied to the touch screen has been touched, and then notifying the touch screen system. One purpose of the invention is to utilize the notification signal to indicate that any of the physical devices on the touch screen have been touched, and to automatically turn ON all the physical devices on the touch screen. Generally, the physical devices are turned ON when any one of them is touched, and are turned OFF whenever the touch is removed. The notification signal enables the touch screen system to interpret correctly a touch on the screen directly (by finger or stylus), and to eliminate confusion caused by touch detections generated by a physical device. Thus, referring to the example of FIG. 1, a knob controller 11 cannot accidentally cause actuation of a switch 14 portrayed on the screen display, since the act of touching the controller 11 activates the controller 11 and deactivates the virtual displayed devices displayed on the screen.

The invention generally consists of a transponder circuit that is incorporated in a physical control device applied to a resistive touch screen. An antenna is arranged to extend about the perimeter of the resistive touch screen, and the antenna is fed an AC input signal at a known frequency. Each physical control device is provided with a resonant antenna tuned approximately to the frequency radiated by the perimeter antenna, the resonant antenna including a tuned LC tank circuit. A simple switch on each physical control device is used to switch on the resonant antenna only when the physical control device is touched by the user. The AC signal fed to the perimeter antenna may comprise a square wave having periodic OFF states, and the perimeter antenna serves as a pickup system for signals radiated by the resonant antenna of any physical control device. Whenever the perimeter antenna receives a signal from a resonant antenna of a physical control device during the OFF periods of the input signal, the system sends a response signal to the touch screen system to apprise it of the fact that a physical control device is being operated, and that virtual (displayed) control devices should be turned OFF while the touch input from the physical control device is received by the touch screen.

The physical control device may comprise a post having a base portion adapted to be removably adhered to the touch screen, and a stem portion extending coaxially from the base portion. Within the base portion, there is secured a coil (helical or spiral) that forms the inductor portion of the LC resonant antenna. A capacitor is housed within the stem portion of the post, and conductors connected to the coil and capacitor lead to finger touch pads on the outer top surface of the stem. The touch pads are arranged so that any finger touch on the top surface of the post will bridge two or more touch pads and complete the circuit between the inductor and capacitor, thereby enabling the LC antenna to couple resonantly to the AC field radiated by the perimeter antenna.

In a further, generalized embodiment of the invention, the response signal generated by touching the physical controller device may be correlated with a touch detection signal from the touch screen assembly to form a useful combined entry to the host computer system associated with the touch screen. For example, when a post is first placed on a touch screen, the touch screen generates a touch detection at the point (or area) of placement, and the post generates a response signal as described above. The coincidence of these signals may be interpreted by the host computer system, for example, as an indication that the user has installed the post at the touch detection area.

In an alternative embodiment of the invention, the LC resonant antenna described above may be incorporated in a pen or stylus wielded by a touch screen user. In this embodiment the response signal from the resonant antenna is not necessarily used to enable physical control devices while disabling other on-screen touch detections. Rather, the pen is provided with a touch pad area on the outer surface thereof, the touch pad area disposed to be selectively touched by a finger tip of the user. A finger touch on the touch pad area completes a circuit between an inductor and capacitor within the pen, thereby enabling the LC antenna to couple resonantly to the AC field radiated by the perimeter antenna. The resonant antenna output is received and interpreted by the system as an input to the host computer system that is associated with the touch screen system. This input may be used as a mouse click input, whereby the user may use the pen to touch and select a portion of the display associated with the touch screen, while simultaneously entering a mouse click (or double click).

As an adjunct to the alternative embodiment, the pen may be provided with a movable cover member adapted to selectively disable the touch pad portion of the pen. The movable cover may comprise a sleeve-like member secured about the pen, with an opening in the sleeve that permits access to the touch pad area. The cover is rotatable about or movable along the pen, whereby the opening may be moved into non-registration with the touch pad area to prevent a finger touch on the touch pad area, so that accidental mouse click inputs are blocked.

BRIEF DESCRIPTION OF THE DRAWING

FIG. 5A is a functional block diagram of the general electronic systems of the present invention, and FIG. 5B is a partial block diagram of a further embodiment of a portion of the electronic system

FIG. 8 is a side elevation of a further embodiment of the present invention.

DESCRIPTION OF THE PREFERRED EMBODIMENT

Figure 1:
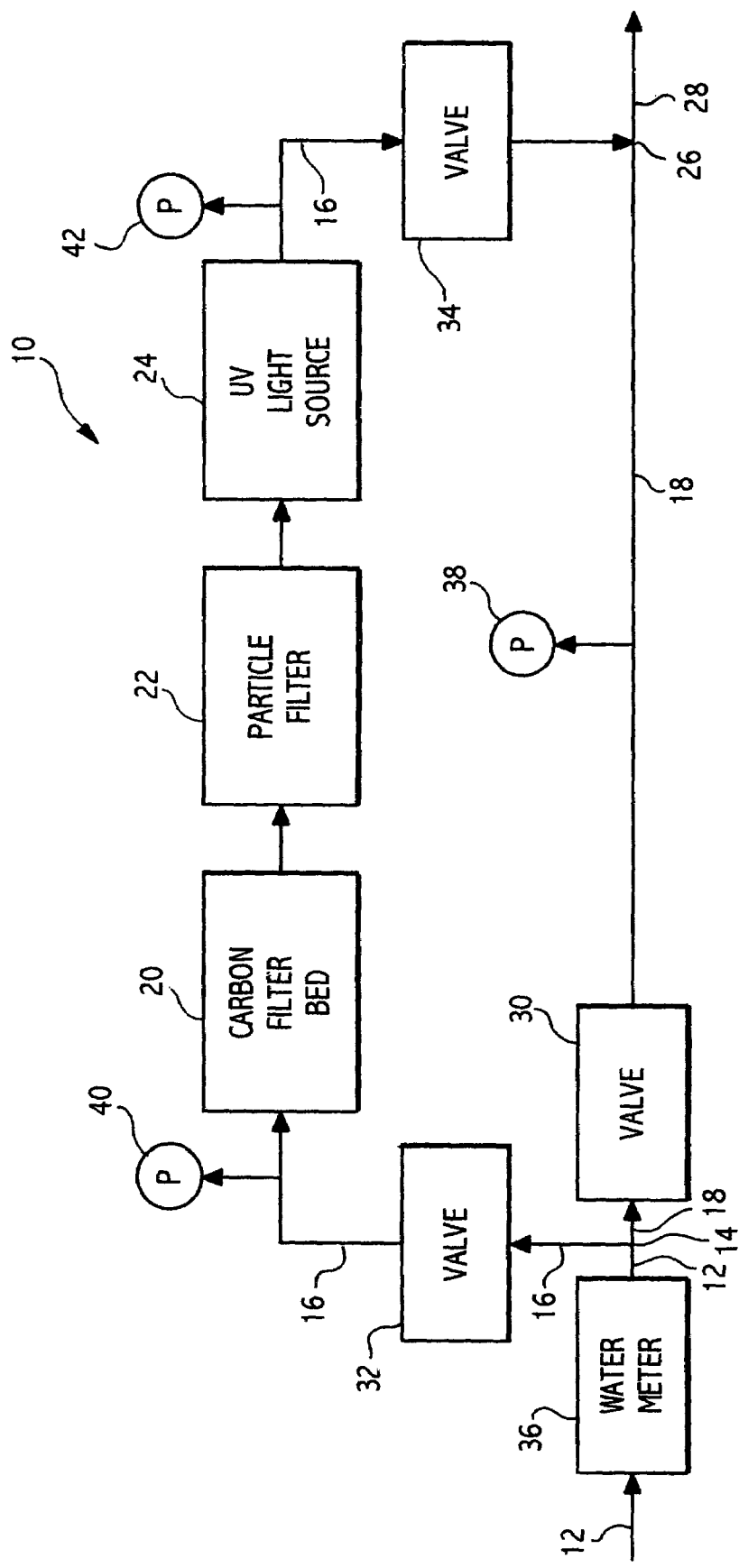
FIG. 1 is a plan view of a touch screen assembly known in the prior art, illustrating a problematic touch screen characteristic.
Figure 2:
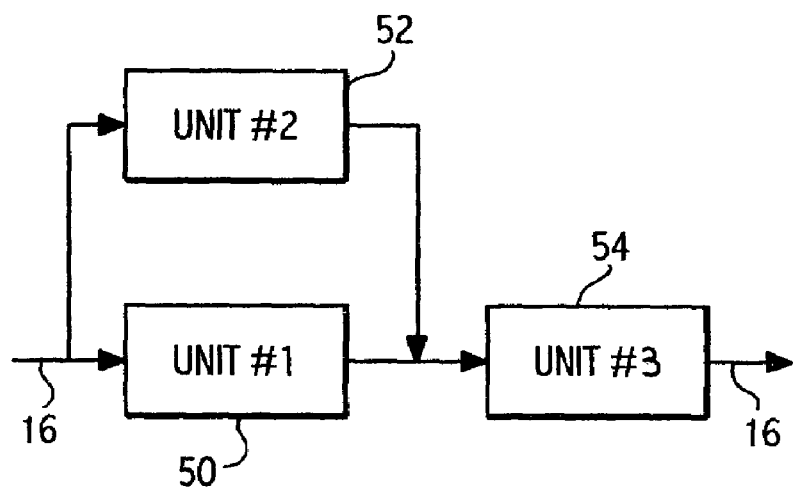
FIG. 2 is a perspective view of a post physical controller of the present invention for use with a resistive-type touch screen assembly.
Figure 3:
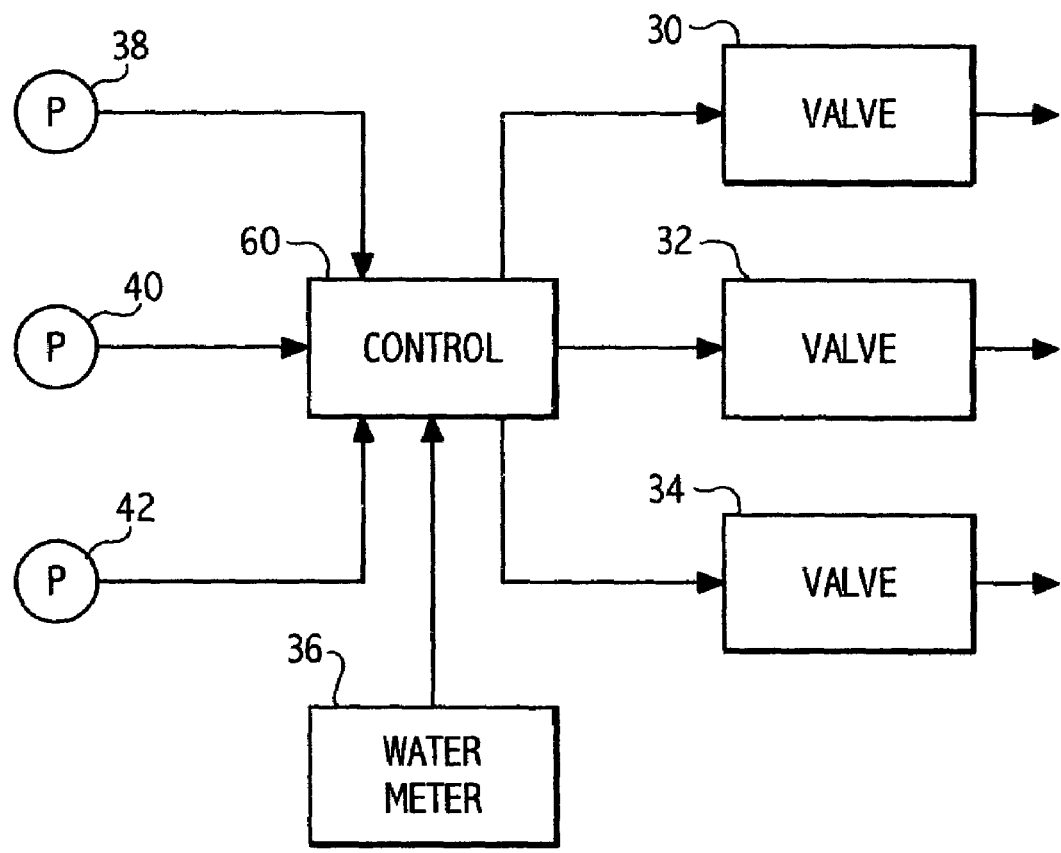
FIG. 3 is a bottom view of the post physical controller shown in FIG. 2.
Figure 4:
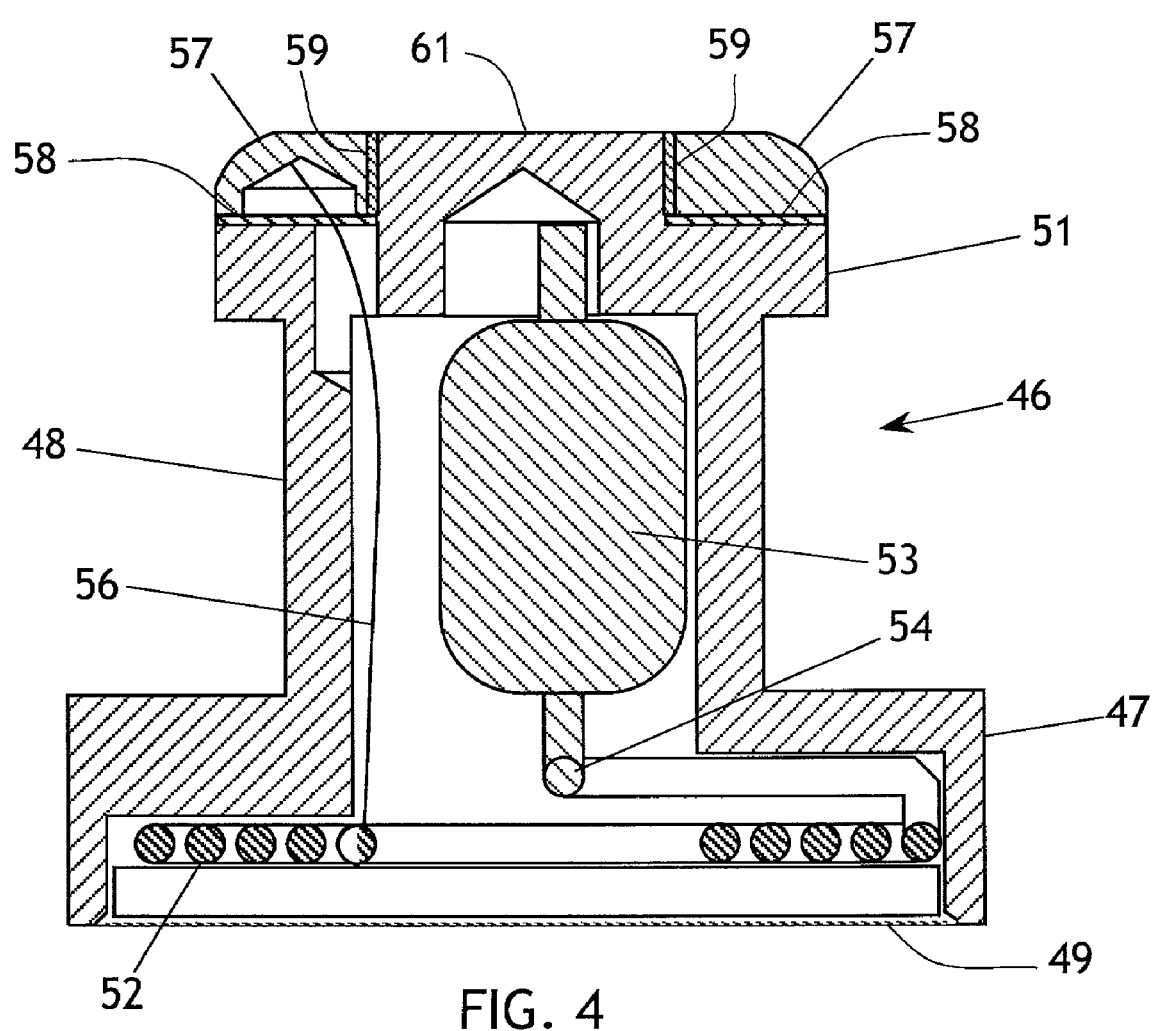
FIG. 4 is a cross-section elevation of the post controller shown in FIGS. 2 and 3.

The present invention generally comprises a system for interactively operating with a touch screen system to signal the touch screen that a physical control device has been activated. With regard to FIGS. 2-4, a physical control device may comprise a post assembly 46 having a base portion 47 and a stem portion 48 extending coaxially therefrom. The base portion may have a diameter greater than that of the stem, and the bottom surface 49 of the base is provided with a releasable adhesive that is adapted to removably secure the base to the outer surface of a touch screen assembly. The outer end of the post assembly 46 is a wider crown 51 that is also coaxially disposed with the stem and base portion.

A salient feature of the post assembly 46 is a resonant antenna formed of an inductive coil 52 and a capacitor 53. The coil may be formed as a spiral winding of conductive wire disposed coaxially within an annular recess in the base portion of the post assembly, and the capacitor may be disposed within a cylindrical cavity within the stem 48. (Other coil layouts and capacitor placements may be used without departing from the spirit and teachings of the invention.) One end of the coil is connected to one lead of the capacitor 53 at point 54. The other end of the coil is connected to a conductor 56. The conductor 56 extends to a conductive annular ring 57 at the crown 51, and the ring 57 is isolated from the crown 51 by insulators 58 and 59. The upper lead of capacitor 53 is connected to the central portion 61 of the crown, which is electrically insulated from the ring 57.

It may be appreciated that any finger touch that extends from the ring 57 to the central crown portion 61 will complete the circuit formed by the coil 52 and the capacitor 53. As a result, such a finger touch actuates the coil-capacitor circuit as a resonant antenna 23, as is described below. Note that other forms of finger touch connection, such as a switch of any kind known in the prior art, may be used in place of the components 57 and 61.

With regard to FIG. 5A, a touch sensing system 31 includes an antenna 34 disposed at the periphery of the touch sensitive area 32 of a resistive-type touch screen, the antenna radiating EM energy at a predetermined frequency that is resonant with respect to the antenna formed by the coil 52 and capacitor 53 of the physical control device. The antenna 34 may comprise one or more turns of wire or conductor about the perimeter of the assembly 33, or any other configuration that is effective to localize the EM field to the touch sensitive area, and is tuned to the appropriate resonant frequency by use of a capacitor 42 which may be connected in parallel or series with the antenna 34. The antenna 34 is powered by a control circuit 41, which in turn is controlled by the host computer.

The apparatus of the invention includes one or more physical control devices 21. Each control device includes a resonant antenna 23, comprised of the inductor coil 52 and capacitor 53 in parallel or series (FIG. 5B) connection to form a resonant circuit having a frequency defined by the respective LC time constant. The antenna 23 receives EM power transmitted from the perimeter antenna 34 at the resonant frequency, and, when the finger touch connection 28 is completed as described above, re-radiates an EM signal at the resonant frequency during the OFF periods of the square wave signal of the perimeter antenna.

Modulated Switched Control System

Figure 6A:
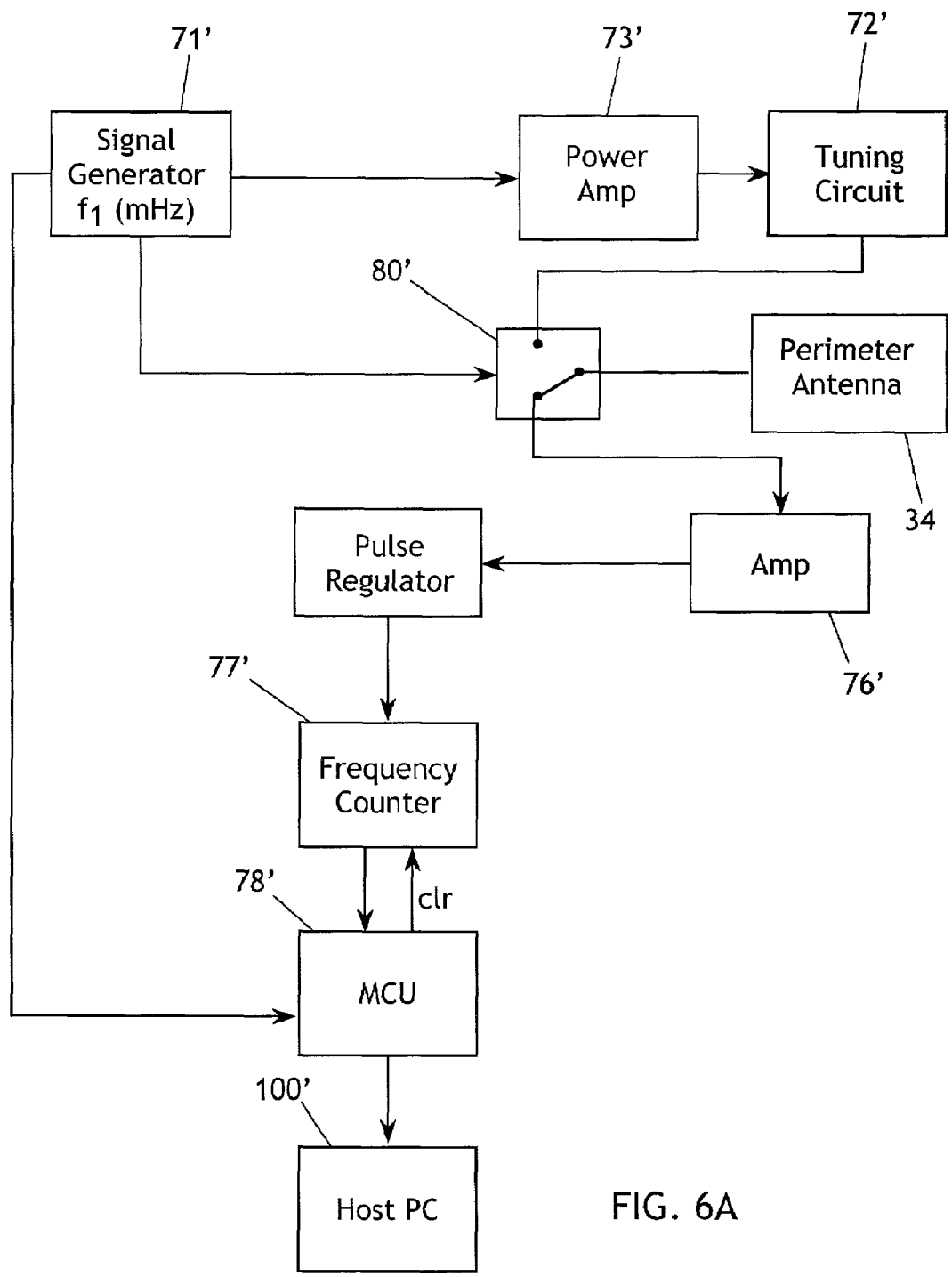
FIG. 6A is a functional block diagram of the electronic components of an unmodulated switched embodiment of the present invention.
Figure 6B:
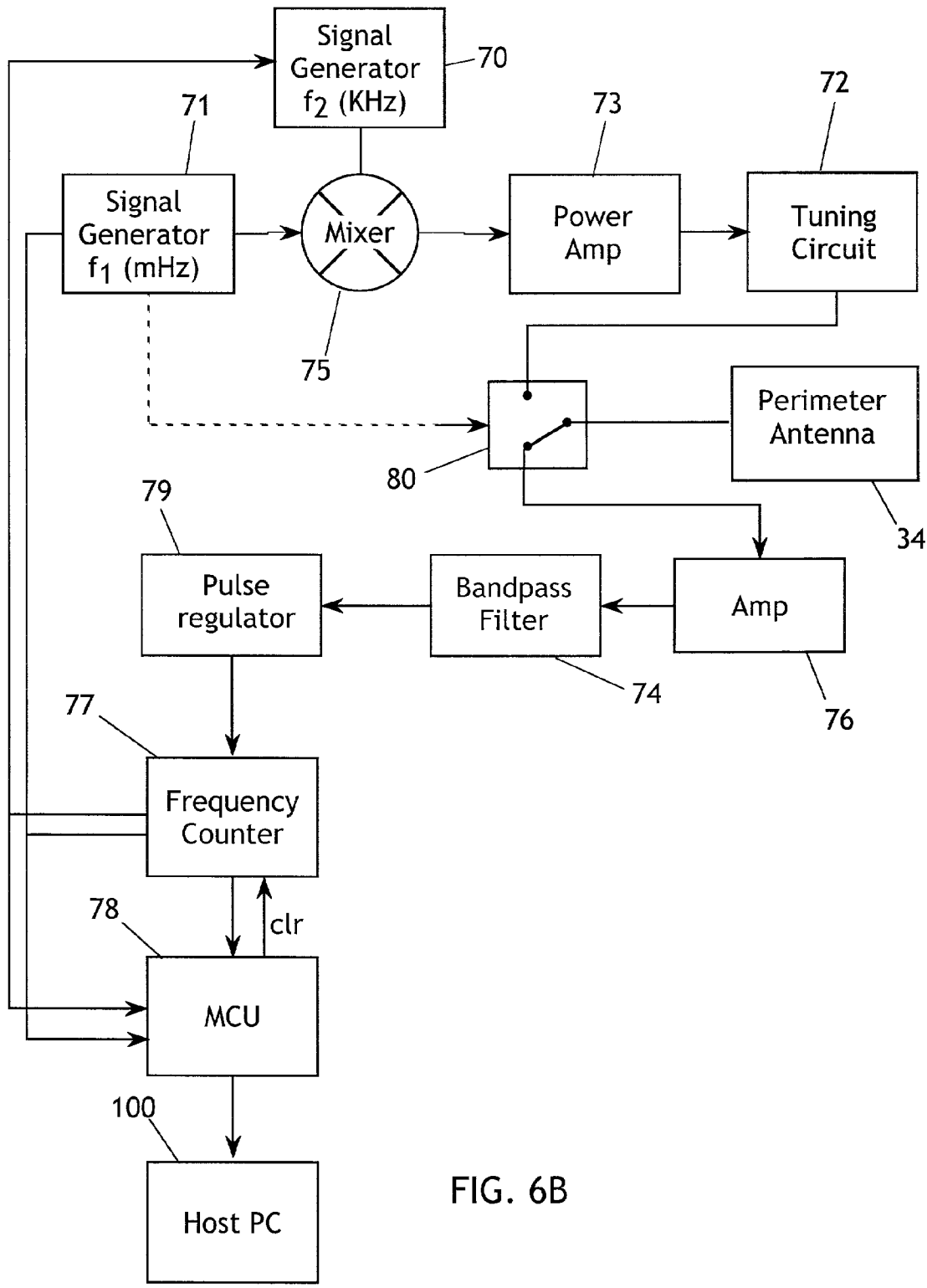
FIG. 6B is a functional block diagram of a modulated embodiment of the invention.

With regard to FIG. 6B, the modulated embodiment of the control system 41 of FIG. 5 includes a signal generator 71, such as a square wave generator generating a signal at frequency $f_1$ in the megahertz range and modulated by a signal at frequency $f_2$ the one hundred kilohertz range from signal generator 70. The modulation is carried out by multiplying the EM signal with the modulating signal using a multiplier or mixer device 75. The signal is boosted by power amplifier 73, and fed through a tuning circuit 72 and to the perimeter antenna 34. The perimeter antenna 34 radiates an EM field and also acts to pick up the radiated EM signal from the resonant antenna 23 of any physical control device placed on the touch screen and activated by the finger touch of a user.

An RF switch 80 is controlled by the EM signal square wave to switch connectivity of the antenna 23 between the transmitter 72 and a receiver circuit. The RF switch 80 must be synchronized with the transmitter such that it is in transmit-on when the transmitter is HIGH and receive-on when the transmitter signal is LOW. The received signal is fed through the receive amplifier 76 and bandpass filter 74 to extract the kHz range modulated signal ($f_2$). The resulting signal is fed to a pulse regulator 79 and conducted to frequency counter 77 to count the kHz range pulses. When the physical device is touched the received signal amplitude is increased because the antenna 34 receives the phase shifted modulated EM signal re-radiated from the physical device. This received EM amplitude modulation is detected as a device "ON" signal. The output of counter 77 is fed to processor 78, and, if a valid "ON" pulse count signal from a physical control device is detected, a control device touch event signal is sent to the host computer 100. The processor 78 periodically clears the counter to prevent a bit overflow error.

Note that the signals $f_1$ and $f_2$ are also fed to the processor 78 and counter 77. Signal $f_1$ serves as a reference frequency for the counter, and signal $f_2$ serves as a reference frequency to count the modulation beats.

Unmodulated Switched Control System

With regard to FIG. 6A, an "unmodulated" embodiment of the control system 41 of FIG. 5A includes some of the same components as the previous embodiment, and are denoted with the same reference numerals having a prime (') designation. The unmodulated system includes a signal generator 71', such as a square wave generator operating at frequency $f_1$ in the megahertz range. The signal is boosted by power amplifier 73' and fed through a tuning circuit 72' to the perimeter antenna 34. The perimeter antenna 34 radiates an EM field and also acts to pick up the radiated EM signal from the resonant antenna 23 of any physical control device placed on the touch screen and activated by the finger touch of a user on the finger touch connection of FIG. 5B. An RF switch 80' is controlled by the EM signal square wave to switch connectivity of the antenna 23 between the transmitter and receiver. The RF switch 80' must be synchronized with the transmitter such that it is in transmit-on when the transmitter is HIGH and receive-on when the transmitter signal is LOW. The received signal is fed through the receive amplifier 76' and pulse regulator 79' and conducted to frequency counter 77'. The counter also receives signal $f_1$ to act as a reference frequency for the counter. When the physical device is touched the received signal amplitude is increased because the antenna 34 receives the phase shifted EM signal re-radiated from the physical device. This increase in received EM amplitude is detected as a device "ON" signal.

Figure 10A:
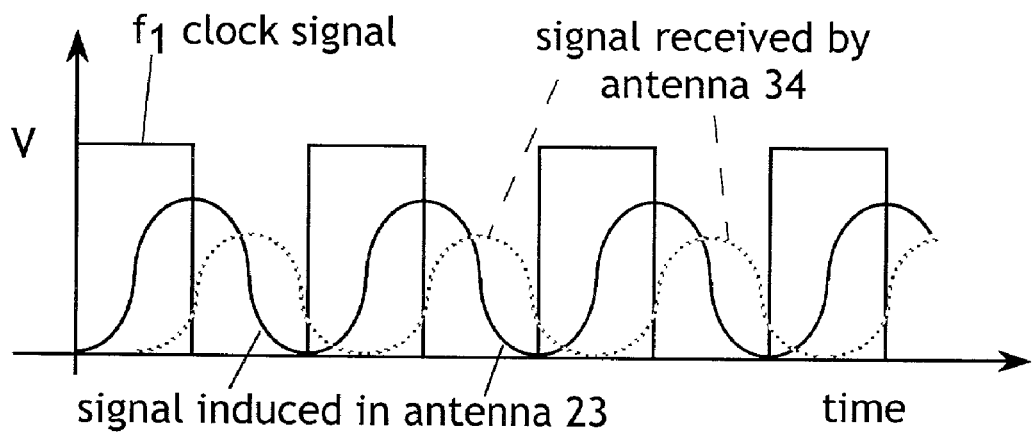
FIGS. 10A and 10B are graphs of voltage versus time for the signals used in the electronic system of the present invention.
Figure 10B:
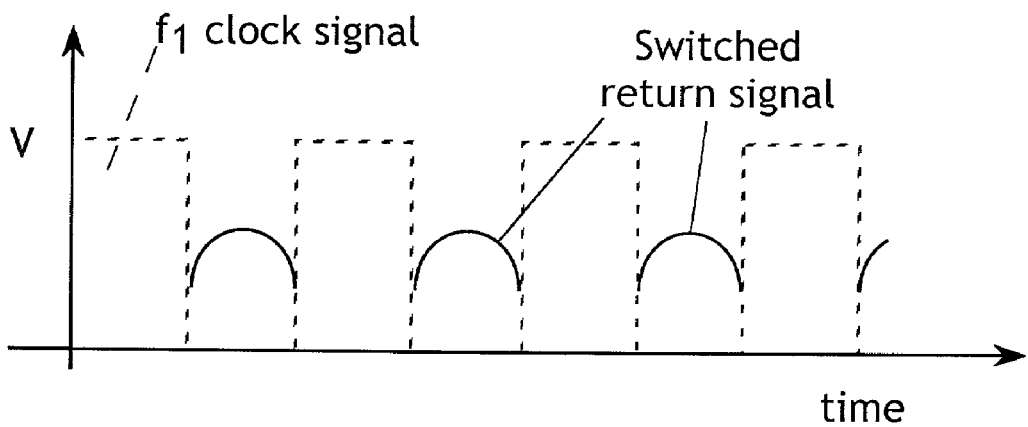

Note, for example, in FIG. 10A, that the signal induced in antenna 23 is approximately 90° out of phase with respect to the square wave signal $f_1$, and the signal received by antenna 34 from the antenna 23 is 180° out of phase. Thus, when the RF switch 80' connects the receiver to the antenna 34, the receiver is exposed to the switched return signal shown in FIG. 10B.

The output of counter 77' is fed to processor 78', and, if a valid "ON" pulse count signal from a physical control device is detected, a control device touch event signal is sent to the host computer 100'.

Unmodulated Unswitched Control System

Figure 6C:
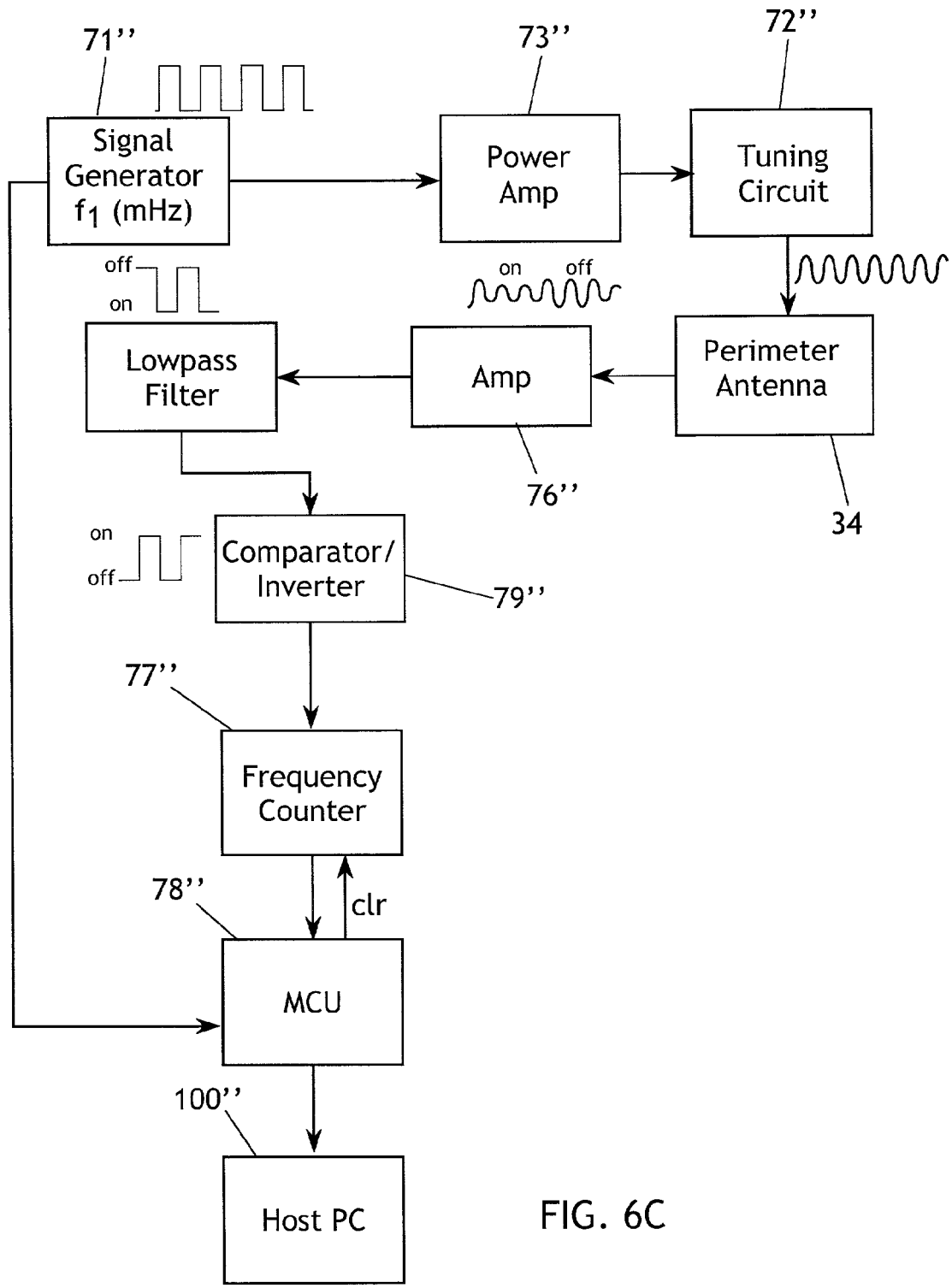
FIG. 6C is a functional block diagram of the electronic components of an unmodulated unswitched embodiment.

With regard to FIG. 6C, the "unmodulated" control system 41 of FIG. 5 includes a signal generator 71", such as a square wave generator operating at frequency $f_1$ in the megahertz range. The signal is fed through a tuning circuit 72" and boosted by power amplifier 73", and fed to the perimeter antenna 34. The perimeter antenna 34 radiates an EM field and also acts to pick up the radiated EM signal from the resonant antenna 23 of any physical control device placed on the touch screen and activated by the finger touch of a user. The received signal is fed through the receive amplifier 76" and to lowpass filter 82, and thence to pulse regulator (comparator/inverter) 79" and frequency counter 77". When the physical device is touched the received signal amplitude is reduced because the physical device induces an EM load while being resonance-coupled with the transmitted signal of the antenna 34. This decrease in received EM amplitude is detected as a physical device "ON" signal. The output of counter 77" is fed to processor 78", and, if a valid "ON" pulse count signal from a physical control device is detected, a control device touch event signal is sent to the host computer 100".

Figure 7:
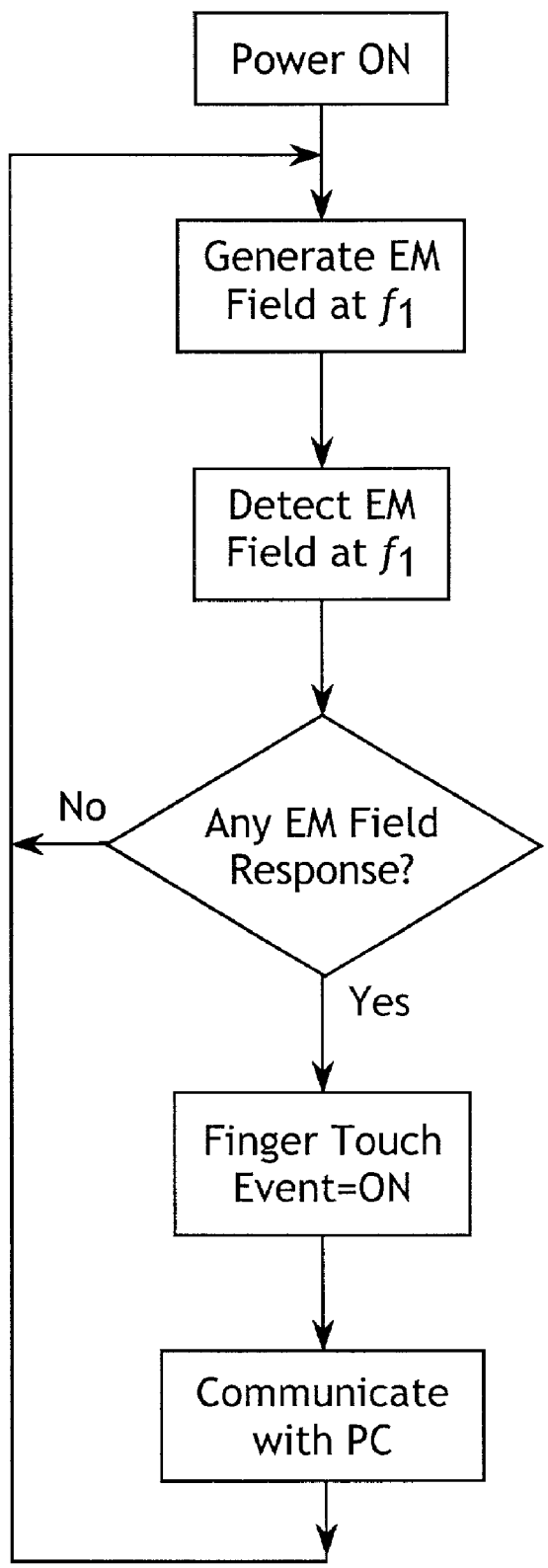
FIG. 7 is a flow chart depicting the operation of the electronic system of the present invention.

With reference to FIG. 7, the system flowchart includes, after power ON, generating an EM field at frequency $f_1$, which is radiated by the antenna 34. Thereafter, the system detects the re-radiated EM field of any device antenna 23 at frequency, using any of the techniques shown in FIGS. 6A-6C. If there is an EM field response, it is interpreted as a finger touch event, which is communicated to the host computer (PC or the like). If there is no EM field response, the system continues to transmit the EM field from the perimeter antenna and to detect any re-radiated field.

The finger touch event on a physical control device may be interpreted by the host computer in any useful manner. As one example, the finger touch event may be used to determine that a physical control device is being operated, and that all physical control devices should be turned ON, to the exclusion of other touch inputs to the touch screen. When the finger touch event ceases, the physical control devices are turned OFF and all other touch inputs to the touch screen are enabled. This arrangement avoids the possibility that operation of a physical control device may accidentally cause the activation of a virtual device displayed on-screen, or that a touch input directly to the screen may overlap the touch pattern of a physical control device and cause erroneous inputs.

The response signal generated by touching the physical controller device may be correlated with a touch detection signal from the touch screen assembly to form a useful combined entry to the host computer system associated with the touch screen. For example, when a post 21 is first placed on a touch screen 32, the touch screen generates a touch detection at the point (or area) of placement, and the post generates a response signal as described above. The coincidence of these signals may be interpreted by the host computer system 79, for example, as an indication that the user has installed the post at a particular touch detection area.

With regard to FIG. 8, an alternative embodiment of the invention provides a pen or stylus 81 having a tip 82 adapted to stimulate a touch detection on a resistance-type touch screen 32 equipped with the control circuit 41 and antenna 34. The pen 81 houses a resonant antenna 23 substantially as described above, with a finger touch connection pad 28 on the outer surface of the pen. The touch pad 28 may be placed to be touched by the user when desired to enter a computer command (Finger Touch Event=ON) that is independent of the touch detections of the touch screen 32. This embodiment permits the user, e.g., to enter a mouse click (or double click) while touching a defined area of the touch screen 32, thereby facilitating a computer entry task that has been problematic with touch screen assemblies.

Figure 9:
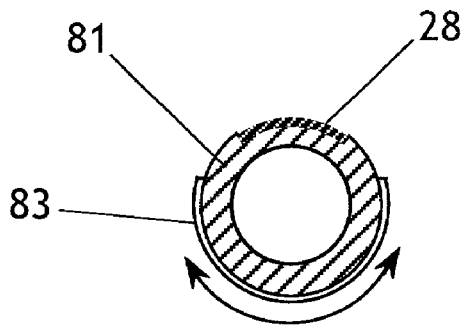
FIG. 9 is a cross-sectional end view of a further embodiment related to the invention as shown in FIG. 8.

With reference to FIG. 9, the pen 81 may be provided with a sleeve-like cover member 83 that is rotatably secured about the barrel of the pen, the sleeve 83 including an opening sufficiently large to permit access to the touch pad connection 28. The cover 83 may be rotated to selectively protect and disable the touch pad 28, so that accidental mouse click inputs or the like may be prevented.

It may be appreciated that the control circuit 41 may be connected not only to a host computer, but also to any sort of electronic device that is designed to be operatively associated with a touch screen.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In a touch screen system that has at least one physical control device operating on a touch screen, the improvement comprising:
   a first antenna secured adjacent to the touch screen, and control circuit means for driving said first antenna to generate an EM field extending across the touch screen;
   said at least one physical control device including resonant antenna means for receiving said EM field and re-radiating an electromagnetic response signal;
   means for releasably adhering said at least one physical control device to said touch screen;
   means for selectively operating said resonant antenna means to re-radiate said response signal when said physical control device is touched by a user, and for selectively disabling said resonant antenna means when said physical control device is not being touched by a user,
   said control circuit further including means for receiving said response signal and entering a control command into an electronic device operatively associated with said touch screen assembly.

2. The improved touch screen assembly of claim 1, wherein said touch screen employs a resistance-type touch detection arrangement.

3. The improved touch screen assembly of claim 1, wherein said first antenna extends at least partially about the perimeter of said touch screen.

4. The improved touch screen assembly of claim 1, wherein said resonant antenna means includes an inductor and a capacitor connected in a resonant circuit.

5. The improved touch screen assembly of claim 4, wherein said means for selectively operating said resonant antenna includes finger touch connection means for completing said resonant circuit upon receiving a finger touch.

6. The improved touch screen assembly of claim 1, wherein said control circuit means includes means for generating a periodic signal for driving said first antenna.

7. The improved touch screen assembly of claim 6, wherein said control circuit means includes means for modulating said periodic signal.

8. The improved touch screen assembly of claim 7, wherein said first antenna serves as a receiving antenna for picking up said response signal, and said means for receiving said response signal is connected to said first antenna.

9. The improved touch screen assembly of claim 6, wherein said means for receiving said response signal includes means for detecting said response signal when said periodic signal is in an OFF state.

10. The improved touch screen assembly of claim 9, wherein said means for receiving said response signal includes counter means for detecting said modulated periodic signal.

11. The improved touch screen assembly of claim 10, wherein said counter means is synchronized by said periodic signal.

12. The improved touch screen assembly of claim 6, wherein said periodic signal is unmodulated.

13. The improved touch screen assembly of claim 12, wherein said first antenna serves as a receiving antenna for picking up said response signal, and said means for receiving said response signal is connected to said first antenna.

14. The improved touch screen assembly of claim 12, wherein said means for receiving said response signal includes means for detecting said response signal when said periodic signal is in an OFF state.

15. The improved touch screen assembly of claim 1, further including means for correlating said response signal with the position of a touch detection signal from said touch screen to form inputs to said electronic device.

16. In a touch screen system that has at least one physical control device operating on a touch screen, the improvement comprising:
   a first antenna secured adjacent to the touch screen, and control circuit means for driving said field antenna to generate an EM field extending across the touch screen;
   said at least one physical control device including resonant antenna means for receiving said EM field and re-radiating an electromagnetic response signal;
   means for selectively operating said resonant antenna means to re-radiate said response signal when said physical control device is touched by a user, and for selectively disabling said resonant antenna means when said physical control device is not being touched by a user, said control circuit further including means for receiving said response signal and entering a control command into an electronic device operatively associated with said touch screen assembly, wherein said physical control device includes a post assembly, said post assembly including a base portion having a surface adapted to releasably engage said touch screen.

17. The improved touch screen assembly of claim 16, wherein said resonant antenna means includes an inductor coil secured within said base portion.

18. The improved touch screen assembly of claim 17, wherein said base portion is generally cylindrical, and said inductor coil is disposed in coaxial alignment with said base portion.

19. The improved touch screen assembly of claim 16, wherein said post assembly includes a outer crown end, and said means for selectively operating said resonant antenna includes a plurality of switch contacts secured to said crown end.

20. In a touch screen system that has at least one physical control device operating on a touch screen, the improvement comprising:

a first antenna secured adjacent to the touch screen, and control circuit means for driving said first antenna to generate an EM field extending across the touch screen;

said at least one physical control device including resonant antenna means for receiving said EM field and re-radiating an electromagnetic response signal;

means for selectively operating said resonant antenna means to re-radiate said response signal when said physical control device is touched by a user, and for selectively disabling said resonant antenna means when said physical control device is not being touched by a user, said control circuit further including means for receiving said response signal and entering a control command into an electronic device operatively associated with said touch screen assembly, wherein said physical control device includes a pen;

said pen includes a tip adapted to selectively provoke a touch detection by said touch screen;

said resonant antenna means includes an inductor coil and capacitor secured within said pen;

said means for selectively operating said resonant antenna includes touch contact means on a barrel portion of said pen for completing a circuit between said inductor coil and said capacitor.

further including cover means movably secured to said barrel portion, said cover means including a sleeve-like member extending conformally about a portion of said barrel and being selectively movable concentrically on said barrel portion to cover and uncover said touch contact means and prevent or enable operation of said touch contact means.

21. In a touch screen system that has at least one physical control device operating on a touch screen associated with an electronic device, a method for signaling the electronic device from the physical control device, including the steps of:

releasably adhering said at least one physical control device to said touch screen;

transmitting an EM field in the area adjacent to the touch screen;

providing a resonant antenna in said at least one physical control device, said resonant antenna tuned to said EM field;

selectively operating said resonant antenna to generate a response signal when said physical control device is touched by a user, and selectively disabling said resonant antenna when said physical control device is not being touched by a user, receiving said response signal and entering a control command into the electronic device.

22. The method of claim 21, wherein said receiving step is carried out during OFF cycles of said EM field.

23. The method of claim 21, further including the step of modulating said EM field.

24. The method of claim 21, further including the step of correlating said response signal with the position of a touch detection signal from said touch screen to form an input to said electronic device.

* * * * *